No. 788,468. Patented April 25, 1905.

UNITED STATES PATENT OFFICE.

REGINALD HODGKINS, OF MALVERN, VICTORIA, AUSTRALIA.

METHOD OF MANUFACTURING GOLF-BALLS.

SPECIFICATION forming part of Letters Patent No. 788,468, dated April 25, 1905.

Application filed June 4, 1904. Serial No. 211,183.

*To all whom it may concern:*

Be it known that I, REGINALD HODGKINS, a subject of the King of Great Britain, residing at Lysterville avenue, Malvern, in the State of Victoria and Commonwealth of Australia, have invented an Improved Method of Manufacturing Golf-Balls, of which the following is a specification.

My improved method of manufacturing golf-balls relates to that class of ball which consists of a core made from a composition of rubber and gutta-percha and covered, preferably, with a sheet of gutta-percha.

In carrying out my invention I place a quantity of rubber in one boiler and gutta-percha in another and after supplying the vessels with sufficient napththa to cover the material contained therein subject them to heat until a temperature of 212° Fahrenheit is reached, by which time both the rubber and gutta-percha have been converted into a soluble condition. I then take, preferably, two-thirds (by weight) of rubber and one-third (by weight) of gutta-percha and mix them thoroughly together and allow the mixture to cool, when it is placed in water in another boiler and again subjected to heat until a temperature of 212° Fahrenheit is reached. The composition is next subjected to pressure either by hand or any suitable mechanical means in order to consolidate it and remove all moisture therefrom. It is then removed and placed in an oven and subjected to heat until it begins to melt, when it is removed and again boiled in water until it becomes soft. It is subsequently molded by hand into balls and after covering each, preferably with a sheet of gutta-percha in a plastic condition, as is done in the case of golf-balls made from thread-elastic, they are placed in a ball-press, in which they are pressed to the size and shape desired. They then only require to be painted, when the operation is complete.

Having now particularly described and ascertained the nature of my said invention and in what manner the same is to be performed, I declare that what I claim is—

The method of manufacturing golf-balls consisting in converting rubber and gutta-percha separately into a soluble condition, intimately admixing in or about the proportions stated, cooling, subsequently boiling in water, subjecting to pressure, heating in an oven until the melting-point is reached, again boiling in water, molding into balls, and covering with gutta-percha in a plastic condition, and finally submitting said balls to pressure in a ball-press substantially as described.

In testimony whereof I have hereunto set my hand in presence of two subscribing witnesses.

REGINALD HODGKINS.

Witnesses:
WALTER S. BAYSTON,
FRANK BAYSTON.